US012584802B2

(12) United States Patent
Ragab et al.

(10) Patent No.: US 12,584,802 B2
(45) Date of Patent: Mar. 24, 2026

(54) METHOD AND APPARATUS FOR TEMPERATURE SENSING

(71) Applicant: Avago Technologies International Sales Pte. Limited, Singapore (SG)

(72) Inventors: Kareem Abdelghani Ibraheem Mohamed Ragab, Irvine, CA (US); Xiaofeng Lin, Irvine, CA (US); Darwin Cheung, Irvine, CA (US); Chi Mo, Irvine, CA (US); Vinay Chandrasekhar, Irvine, CA (US); Jungwoo Song, Irvine, CA (US); Xicheng Jiang, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 445 days.

(21) Appl. No.: 18/117,349

(22) Filed: Mar. 3, 2023

(65) Prior Publication Data

US 2024/0295445 A1 Sep. 5, 2024

(51) Int. Cl.
| *G01K 7/25* | (2006.01) |
| *G01K 15/00* | (2006.01) |
| G01K 1/02 | (2021.01) |
| G01K 7/02 | (2021.01) |
| G01K 7/22 | (2006.01) |

(52) U.S. Cl.
CPC ............. *G01K 7/25* (2013.01); *G01K 15/005* (2013.01); *G01K 1/026* (2013.01); *G01K 7/02* (2013.01); *G01K 7/22* (2013.01)

(58) Field of Classification Search
CPC .......... G01K 7/25; G01K 15/005; G01K 7/22; G01K 1/026; G01K 7/02
See application file for complete search history.

(56) References Cited

U.S. PATENT DOCUMENTS

2014/0355651 A1 12/2014 Hong et al.
2021/0226646 A1* 7/2021 Nieddu .................... G01K 7/02

FOREIGN PATENT DOCUMENTS

KR 101481290 B1 1/2015

OTHER PUBLICATIONS

European Search Report on non-Foley case related to U.S. Appl. No. 18/117,349 DTD Jul. 8, 2024.

* cited by examiner

*Primary Examiner* — Joseph J Lauture
(74) *Attorney, Agent, or Firm* — Foley & Lardner LLP

(57) ABSTRACT

An apparatus includes a temperature sensing circuit that includes both on-chip and off-chip components. The apparatus includes components that use the same source as a reference voltage, thus allowing variations in the reference voltage to be compensated for. Additionally, the apparatus can provide error averaging to compensate for deterministic error sources.

18 Claims, 5 Drawing Sheets

APPARATUS
100

TEMPERATURE
SENSING
COMPONENTS
106

ADC
110

CONTROLLER
102

MEMORY
104

LOGIC
CIRCUITRY
112

500

OBTAIN, FROM A FIRST SAMPLE, A FIRST VOLTAGE MEASUREMENT — 502

INSTRUCT THE SWITCH TO REVERSE A POLARITY OF THE VOLTAGE OFFSET — 504

SUBSEQUENT TO THE REVERSAL OF THE POLARITY, OBTAIN, FROM A SECOND SAMPLE, A SECOND VOLTAGE MEASUREMENT — 506

DETERMINE AN AVERAGE OF THE FIRST VOLTAGE AND THE SECOND VOLTAGE — 508

METHOD AND APPARATUS FOR TEMPERATURE SENSING

TECHNICAL FIELD

This application is directed to temperature sensing circuitry, and more particularly, to enhanced temperature sensing with error compensation techniques.

BACKGROUND

Temperature sensing circuits are designed to provide a digital output corresponding to, for example, ambient temperature. In some instances, an analog signal is generated based on a measured temperature, and is converted to a digital signal that is input to a processing circuit. When various components are used in the temperature sensing circuit, each component may include variations in manufacturing or may change over time due to aging or semiconductor package strain.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
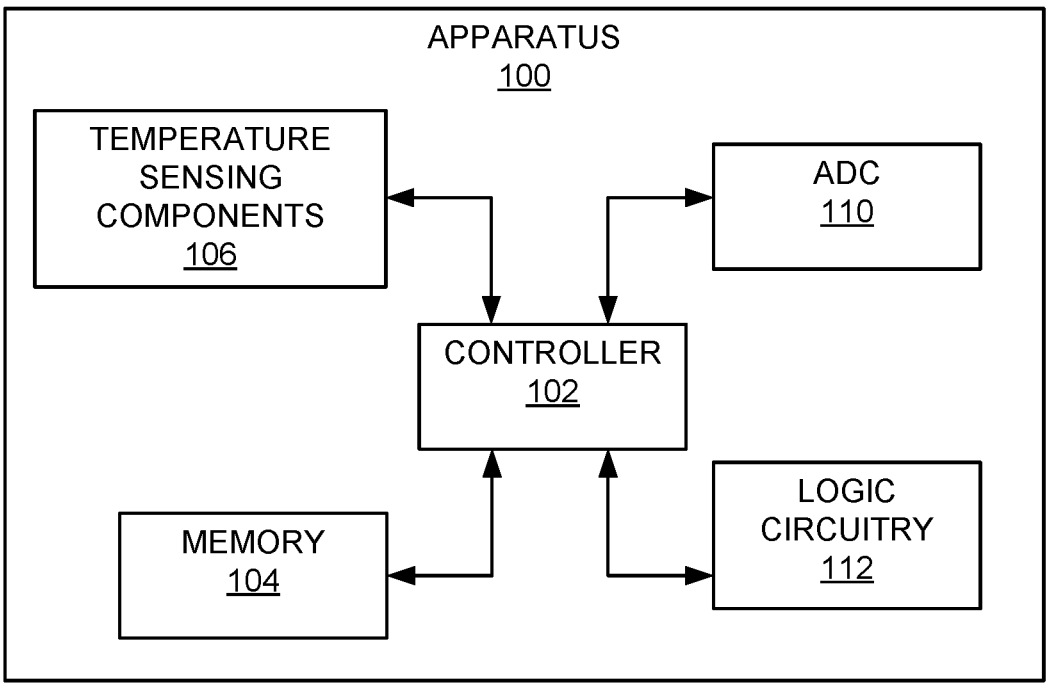
FIG. 1 illustrates a schematic diagram of an apparatus, in accordance with aspect of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is directed to temperature sensing circuits. Temperature sensing circuits described herein may be installed in various devices that require temperature sensing of human beings or the ambient environment. As non-limiting examples, such devices include wearable devices (e.g., smartwatches, calorie-tracking devices, or the like) and digital thermometers.

A temperature sensing circuit may include multiple amplifiers (e.g., operational amplifiers) that receive a reference voltage and act as reference buffers that provide electrical current to a component on the temperature sensing circuit. In some instances, each amplifier is driven with a different reference voltage (e.g., from different/separate voltages sources). As a result, the respective reference voltages, when applied to different components, may be different from an expected voltage at a node or component common to both amplifiers. For example, a reference voltage applied to resistors (e.g., resistor divider, resistor bridge) used in temperature sensing may be different from a reference voltage used to drive an analog-to-digital converter (ADC). Moreover, respective offset voltages at the inputs of the amplifiers vary due in part to manufacturing tolerances, aging, and/or package strain. Each of these differences can lead to errors in temperature sensing.

In order to overcome these error sources, one approach of the subject technology uses the same reference voltage between, or among, multiple amplifiers and an ADC. For example, the reference voltage from an output of an amplifier used to provide a voltage across resistors is also provided, along a separate path, to an input of an additional amplifier used to drive the ADC. As a result, the voltage applied to the resistors and the ADC is the same voltage and through a ratiometric measurement, a digital output used to generate a temperature reading is independent of the reference voltage. Beneficially, temperature sensing using the resistors is not sensitive to voltage differences (e.g., differences between two different reference voltages).

Alternatively, or in combination, temperature sensing circuits described herein may include switches integrated at the inputs of some components. For example, a switch can be integrated an input to an amplifier to drive the ADC as well as at an input to the ADC that receives a voltage (used to measure a temperature) from the resistors to the ADC. The switches are designed to switch polarity of a voltage. For example, the temperature sensing circuit can sample a voltage at an output of the switch to obtain a first reading that includes an error value due to voltage offset. Then, the switch reverses the polarity and a subsequent voltage is sampled at the output of the switch to obtain a second reading. Based on the polarity switch, the average of the sampled offset or error voltages is 0 Volts (V), or near 0 V. Using this error averaging technique, the error value can be compensated and removed prior to temperature sensing. The terms "compensate," "compensating," or "compensated" refers to an offset of a value (e.g., voltage), which may include a reduction or complete elimination, or cancelling, of the value. This process can be performed to track errors when desired. Beneficially, errors occurring over time due to aging, package strain, error due to drift, and temperature-based errors can be compensated during a temperature sensing event.

Also, in some embodiments, at least some of the resistors used in temperature sensing can be physically located on an integrated circuit, or chip, that forms the temperature sensing circuit. Beneficially, errors due to variations in resistance values and resistor mismatch can be compensated for using the above-referenced sampling and polarity reversal operation.

These and other embodiments are discussed below with reference to FIGS. 1-5. However, those skilled in the art will readily appreciate that the detailed description given herein with respect to these Figures is for explanatory purposes only and should not be construed as limiting.

According to some embodiments, for example as shown in FIG. 1, a schematic diagram of an apparatus 100 is shown. In some embodiments, the apparatus 100 takes the form of an integrated circuit with various components shown and described herein. Also, the apparatus 100 can take the form of a temperature sensing circuit.

As shown, the apparatus 100 includes a controller 102. The controller 102 may include a microcontroller, an application-specific controller, or a combination thereof.

The apparatus 100 may further include a memory 104 coupled to the controller 102. The memory 104 stores executable instructions and algorithms used by the controller 102 to implement various functions of the apparatus 100.

The apparatus 100 may further include temperature sensing components 106. In some embodiments, the temperature sensing components 106 include resistors, or one or more sets of resistors, with at least one of the resistors being a temperature-dependent resistor (e.g., thermistor) in which the resistance (e.g., electrical resistance) changes by a measurable value based upon a change in temperature at the temperature-dependent resistor.

The apparatus 100 may further include an ADC 110. In some embodiments, the ADC 222 includes a successive approximation register (SAR) ADC. The ADC 110 is designed to receive an analog signal from the temperature sensing components 106 and convert the analog signal into a digital signal. The analog signal from the temperature sensing components 106 varies in accordance with the change in resistance of the temperature sensing components 106. Accordingly, a change (e.g., increase or decrease) in temperature, as determined by the temperature sensing components 106, corresponds to a change (e.g., increase or decrease, respectively) in the analog signal.

The apparatus 100 may further include logic circuitry 112 designed to convert the output (e.g. digital signal) from the ADC 110 into a temperature. As a non-limiting example, the logic circuitry 112 may include inversion logic with one or more logic gates used to transform a digital signal into a temperature value (e.g., in degrees Celsius or Fahrenheit). Alternatively, the logic circuitry 112 may be used to carry out steps in an algorithm to convert a digital input into a temperature.

Figure 2:
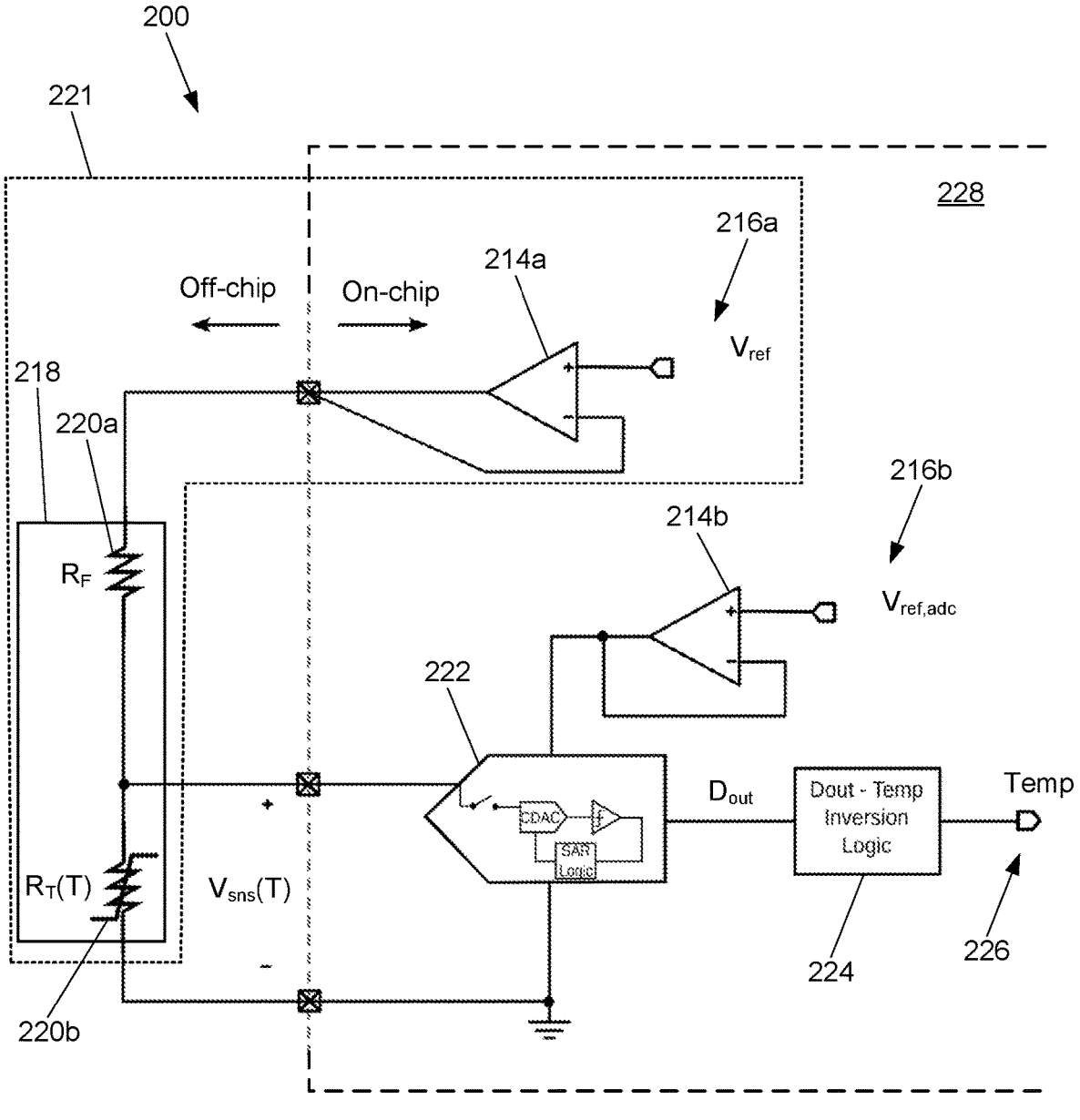
FIG. 2 illustrates an embodiment of an apparatus, according to one approach of temperature sensing.

Referring to FIG. 2, an apparatus 200 for temperature sensing is shown. The apparatus 200 may take the form of a temperature sensing circuit. The apparatus 200 includes an amplifier 214a used as a reference buffer for a reference voltage 216a ($V_{ref}$) input into the amplifier 214a.

The voltage from the amplifier 214a passes through a resistor divider 218 that includes a resistor 220a ($R_F$) and a resistor 220b ($R_T$(T)). In some embodiments, the resistor 220a is a reference resistor designed as a comparison standard for the apparatus 200, and in particular, for the resistor 220b. In some embodiments, the resistor 220b is a temperature-dependent resistor (e.g., thermistor, resistant thermometer) designed to respond to a temperature change with a measurable change in resistance. By comparison, the resistor 220a, as a reference resistor, may be much less change in resistance, ideally no change, as compared to the resistor 220b. The resistor divider 218 can produce an output voltage, based on the resistors 220a and 220b, that is a fraction of the input voltage (e.g., $V_{ref}$). The fractional output voltage at each of the resistors is determined by dividing the resistance of that resistor by the sum of the resistance of the resistors. Moreover, when the resistor 220b is used a temperature-dependent resistor, the voltage $V_{sns}$(T) (a voltage dependent upon the temperature T) is a fraction of the input voltage to the resistor divider 218, and is the voltage measured across the resistor 220b. The voltage $V_{sns}$(T) is measured using a sensing bridge and changes based on changes in resistance of the resistor 220b. For example, when the temperature increases, the electrical resistance of the resistor 220b decreases, and the voltage $V_{sns}$(T) decreases. In this regard, the voltage $V_{sns}$(T) is a resistor voltage representing a temperature-dependent voltage that can be used to determine temperature. As shown, the amplifier 214a and the resistor divider 218 represent an analog front end 221 ("AFE") of the apparatus 200.

The apparatus 200 includes an amplifier 214b used as a reference buffer for a reference voltage 216b ($V_{ref,adc}$) input into the amplifier 214b. The apparatus 200 further includes an ADC 222. The output voltage (e.g., $V_{ref,adc}$) from the amplifier 214b can be used to provide a reference voltage to the ADC 222.

Referring again to the voltage $V_{sns}$(T), $V_{sns}$(T) is provided to the ADC 222, which generates a digital output $D_{out}$ based on the analog voltage. When the ADC 222 takes the form of a SAR ADC, the ADC 222 may include a capacitive digital-to-analog converter (CDAC) with n capacitors (each having binary weighted values), a comparator that compares two voltages, and SAR logic that determines a digital output based on the voltage comparison at the comparator. As an example, the n capacitors of the CDAC may include a capacitor with a capacitance C used as the least significant bit (LSB), with each capacitor successively increasing by 2× (or two times) up to the most significant bit (MSB). Through an acquisition phase, the ADC 222 receives the voltage $V_{sns}$(T) and applies the voltage $V_{sns}$(T) to the n capacitors. Once the voltage V across the n capacitors is discharged, a voltage V at the comparator is measured. Then, during a conversion phase, the comparator compares the voltage V to the reference voltage ($V_{ref,adc}$), when applied first to capacitor corresponding to the MSB, and the SAR logic generates a bit decision (e.g., binary value 0 or 1). When the comparator indicates the voltage across the capacitor (based on the reference voltage scaled by the CDAC weight) is less than the voltage V, the SAR logic generates a bit decision 1, and the capacitor remains connected to $V_{ref,adc}$. When the comparator indicates the voltage across the capacitor (based on the reference voltage scaled by the CDAC weight) is greater than the voltage V, the SAR logic generates a bit decision 0, and the capacitor connects to ground. After the MSB capacitor, the process is successively applied to each capacitor from the next MSB capacitor (e.g., MSB−1) to the LSB. For n capacitors, the ADC 222 will generate an n-bit digital output, which corresponds to $D_{out}$ in FIG. 2. The apparatus 200 further includes a logic circuit 224 designed to convert the digital output $D_{out}$ into a temperature 226.

As shown in FIG. 2, the apparatus 200 includes a substrate 228. In some embodiments, the substrate 228 includes an integrated circuit, a chip, or a die. Some components of the apparatus 200 include components located on the substrate 228. An "on-chip" component refers to a component that is physically located on the substrate 228. Conversely, an "off-chip" component (e.g., resistor divider 218) refers to a component that is not physically located on the substrate 228, e.g., a component that is physically off of the substrate 228, and may be physically located on another substrate (not shown in FIG. 2) that is separate from the substrate 228. Moreover, an off-chip components may nonetheless be in communication (e.g., electrical communication) with any one or more components on the substrate 228. Based on the layout of the circuitry of the apparatus 200, additional space may be required for the off-chip components.

Also, based on the reference voltages 216a and 216b applied to the amplifiers 214a and 214b, respectively, the voltage at the AFE 221 and the ADC 222 may be different and the voltage $V_{sns}$(T) sensed across the resistor 220b may vary with variance of the voltage between the amplifiers 214a and 214b. Cumulatively, the respective variations may cause the voltage $V_{sns}$(T) to be greater than or less than an expected value, and the voltage at the comparator of the ADC 222 to be greater than or less than an expected value. This may lead to errors in the digital output $D_{out}$ from the ADC 222, and in turn an inaccurate reading of the temperature 226. In some instances, high-precision calibration and correction techniques can overcome these errors.

Figure 3:
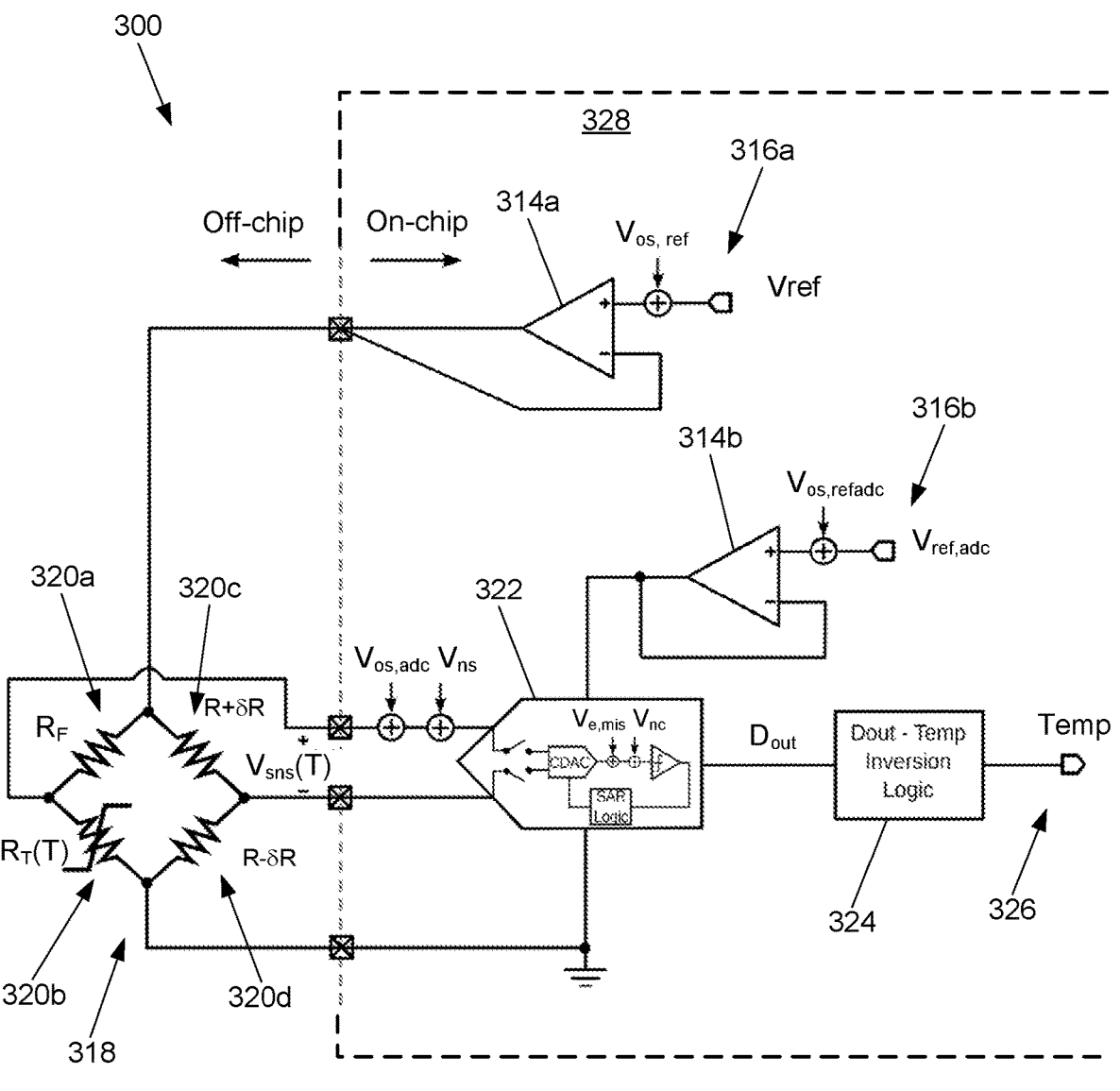
FIG. 3 illustrates an embodiment of an apparatus, according to another approach of temperature sensing.

Referring to FIG. 3, an apparatus 300 is shown. In some embodiments, the apparatus 300 is a temperature sensing circuit. The apparatus 300 may include an amplifier 314*a* and an amplifier 314*b* used as a reference buffer for a reference voltage 316*a* ($V_{ref}$) and a reference voltage 316*b* ($V_{ref,adc}$). The voltage $V_{ref}$ from the amplifier 314*a* passes through a resistor assembly 318 of the apparatus 300, and the voltage $V_{ref,adc}$ from the amplifier 314*b* is used to provide a reference voltage to an ADC 322 of the apparatus 300. The ADC 322 may include any features shown and described herein for an ADC. As shown in FIG. 3, the apparatus 300 include several on-chip components (e.g., amplifiers 314*a* and 314*b*) that are physically located on a substrate 328 of the apparatus 300. The substrate 328 may include any features shown and described herein for a substrate. As shown, several off-chip components (e.g., resistor assembly 318) are not physically located on the substrate 328, and may be physically located on another substrate (not shown in FIG. 3) that is separate from the substrate 328.

The resistor assembly 318 includes a resistor 320*a* ($R_F$), a resistor 320*b* ($R_T$(T)), a resistor 320*c* (R+δR), and a resistor 320*d* (R−δR). In some embodiments, the resistor assembly 318 is a resistor bridge. In some embodiments, the resistor 320*a* is a reference resistor and the resistor 320*b* is a temperature-dependent resistor (e.g., thermistor, resistant thermometer) designed to respond to a temperature change with a measurable change in electrical resistance. Also, in some embodiments, the resistors 320*c* and 320*d* are used to balance (e.g., find a balanced voltage output) the resistor assembly 318. As shown, the resistors 320*c* and 320*d* have a resistance difference equal to 28.

Based on the resistor 320*b* being a temperature-dependent resistor, an output voltage ($V_{sns}$(T)) from the resistor assembly 318 is a resistor voltage that represents a temperature-dependent voltage that can be used to determine a temperature. The analog signal from the resistor assembly 318 provides two inputs to the ADC 322, which are converted to a digital output $D_{out}$ similar to a manner previously described. The apparatus 300 further includes a logic circuit 324 designed to convert the digital output $D_{out}$ into a temperature 326.

Similar to the apparatus 200 (shown in FIG. 2), the apparatus 300 may include error sources, which can lead to errors in the digital output $D_{out}$, and accordingly, errors in the value of the temperature 326. For example, the variations in voltages due to using reference voltages 316*a* and 316*b* can lead to variations that cause the voltage $V_{sns}$(T) to be greater than or less than an expected value. Additionally, an offset voltage $V_{os}$ at the input of components may lead to additional error. An offset voltage refers to an error voltage between the input and output of a component, for example, when 0 V is applied at the input. A voltage offset $V_{os,ref}$ at an input of the amplifier 314*a*, a voltage offset $V_{os,refadc}$ at an input of the amplifier 314*b*, and a voltage offset $V_{os,adc}$ at an input to the ADC 322 are exemplary voltage offsets. Moreover, errors due to variation in resistance of the resistors (e.g., resistors 320*c* and 320*d*) may also lead to errors. Still further, errors due to noise $V_{ns}$ at an input of the ADC

322, as well as capacitor mismatch error $V_{e,mis}$ and conversion noise $V_{nc}$ during the conversion phase of the ADC 322, can also contribute to errors.

Some temperature sensing circuits are designed to compensate for one or more of the aforementioned errors. For example, referring to FIG. 4, an apparatus 400 is shown. In some embodiments, the apparatus 400 is a temperature sensing circuit. The apparatus 400 may include an amplifier 414*a* used as a reference buffer for a reference voltage 416 ($V_{ref}$). The output voltage ($V_{ref\_sns}$) passes through a resistor assembly 418, which includes a resistor 420*a* ($R_F$), a resistor 420*b* ($R_T$(T)) forming a resistor divider. Thus, the resistors 420*a* and 420*b* are designed to sense the voltage $V_{ref\_sns}$. In some embodiments, the resistor 420*a* includes a reference resistor and the resistor 420*b* includes a temperature-dependent resistor (e.g., thermistor, resistant thermometer) designed to respond to a temperature change with a measurable change in electrical resistance. The resistor assembly 418 further includes a resistor 420*c* (R+δR), and a resistor 420*d* (R−δR). In some embodiments, the resistors 420*c* and 420*d* are used to balance (e.g., find a balanced voltage output) of the resistor assembly 418. In this regard, the resistors assembly 418 can form a resistor bridge. As shown, the resistors 420*c* and 420*d* have an electrical resistance difference equal to 2δ. Also, the amplifier 414*a* and the resistors 420*a* and 420*b* represent an AFE 421 of the apparatus 400.

Additionally, the output voltage $V_{ref\_sns}$ from the amplifier 414*a* is provided as a reference voltage at an input to an amplifier 414*b* of the apparatus 400, which is then provided as a reference voltage to an ADC 422 of the apparatus 400. Generally, the ADC 422 operates in a manner similar to that of the ADC 222 (shown in FIG. 2). However, the CDAC may include a segmented CDAC designed to provide additional error correction. As a result, the voltage at the AFE 421 and the ADC 422 share the same reference voltage. Beneficially, the reference voltage $V_{ref\_sns}$ across the resistor 420*b* is the same as the reference voltage $V_{ref\_adc}$ provided to the ADC 422, and the voltage $V_{sns}$(T) sensed across the resistor 420*b* is not sensitive to variations caused by different reference voltages. For example, normally the voltage $V_{sns}$(T) sensed across the resistor 420*b* is proportional to the input voltage $V_{ref\_sns}$, and is a ratio of the electrical resistance of the resistor 420*b* divided by the total electrical resistance of the resistors 420*a* and 420*b* based on the equation:

$$V_{sns}(T) = \left( \frac{R_T(T)}{R_F + R_T(T)} \right) * V_{ref\_sns}$$

However, the same voltage $V_{ref\_sns}$ is also provided from the amplifier 414*b* and compensates (e.g., cancels with) the voltage $V_{ref\_sns}$ (in the above equation) provided by the amplifier 414*a*, as the value of the voltage $V_{ref\_sns}$ appears across the resistors 420*a* and 420*b*, and $V_{ref\_adc}$ is the same value as $V_{ref\_sns}$. In this manner, the voltage $V_{ref\_sns}$ effectively appears at a node 431 after passing through each of the amplifiers 414*a* and 414*b*. As a result, the digital output $D_{out}$ from the ADC 422 is no longer dependent upon the voltage $V_{ref\_sns}$. Beneficially, using the same reference voltage through amplifiers 414*a* and 414*b* can eliminate at least some errors in the voltage $V_{sns}$(T), and a logic circuit 424 of the apparatus 400 designed to convert the digital output $D_{out}$ into a temperature 426 may provide enhanced accuracy for the temperature 426.

Also, in order to compensate for voltage offsets, the apparatus 400 may include additional modifications used in error averaging. For example, the apparatus 400 includes a switch 430*a* and a switch 430*b* at an input and an output, respectively, of the amplifier 414*b*. In some embodiments, the each of the switches 430*a* and 430*b* is a chopping switch (also referred to as a tuning switch) designed to change the polarity of the voltage. In this regard, a sampling operation can be used to compensate for the voltage offset at the amplifier 414*b* ($V_{os,refadc}$). For example, a controller 402 of the apparatus 400 is used to take a first sample that includes the voltage offset $V_{os,refadc}$ with a positive polarity. Then the switch 430*a* can reverse the polarity and the controller 402 takes a second sample. The controller 402 can calculate the average of the first and second samples. Here, the average offset is zero, or close to zero, as the magnitude of the measured offset voltages is the same but with an opposite polarity. This sampling operation may occur at various time voltages to compensate for aging of the apparatus 400, packaging strain to the apparatus 400, and/or temperature changes to one or more components (other than the resistor 420*b*).

Additionally, the controller 402 can perform a sampling operation to compensate for resistor mismatch, and in particular, the mismatch δ between the resistors 420*c* and 420*d*. The apparatus 400 includes a switch 432*a* and a switch 432*b* in series with the resistor 420*c* and the resistor 420*d*, respectively. During a first sample, the controller 402 closes the switch 432*a* and opens the switch 432*b*, and the voltage across the resistor 420*c* is obtained (e.g., measured). Then the switch 430*b* can reverse the polarity and a second sample is taken. During the second sample, the controller 402 opens the switch 432*a* and closes the switch 432*b*, and the voltage across the resistor 420*d* is obtained. The controller 402 calculates the average voltage error to be zero, or close to zero, as the magnitude of the measured error voltages is the same but with opposite polarity. Beneficially, differences due to the δ value between the resistors 420*c* and 420*d* can be compensated for. Additionally, the apparatus 400 includes a switch 430*c*, which can take any form described for the switches 430*a* and 430*b*. The switch 430*c* can be used in a similar manner (e.g., sample, polarity reverse, sample) to compensate for the offset voltage at an input of the ADC 422 ($V_{os, adc}$). Digital chopping implements the same function as the analog switch (e.g. polarity reversal) but in the digital domain.

Figure 4:
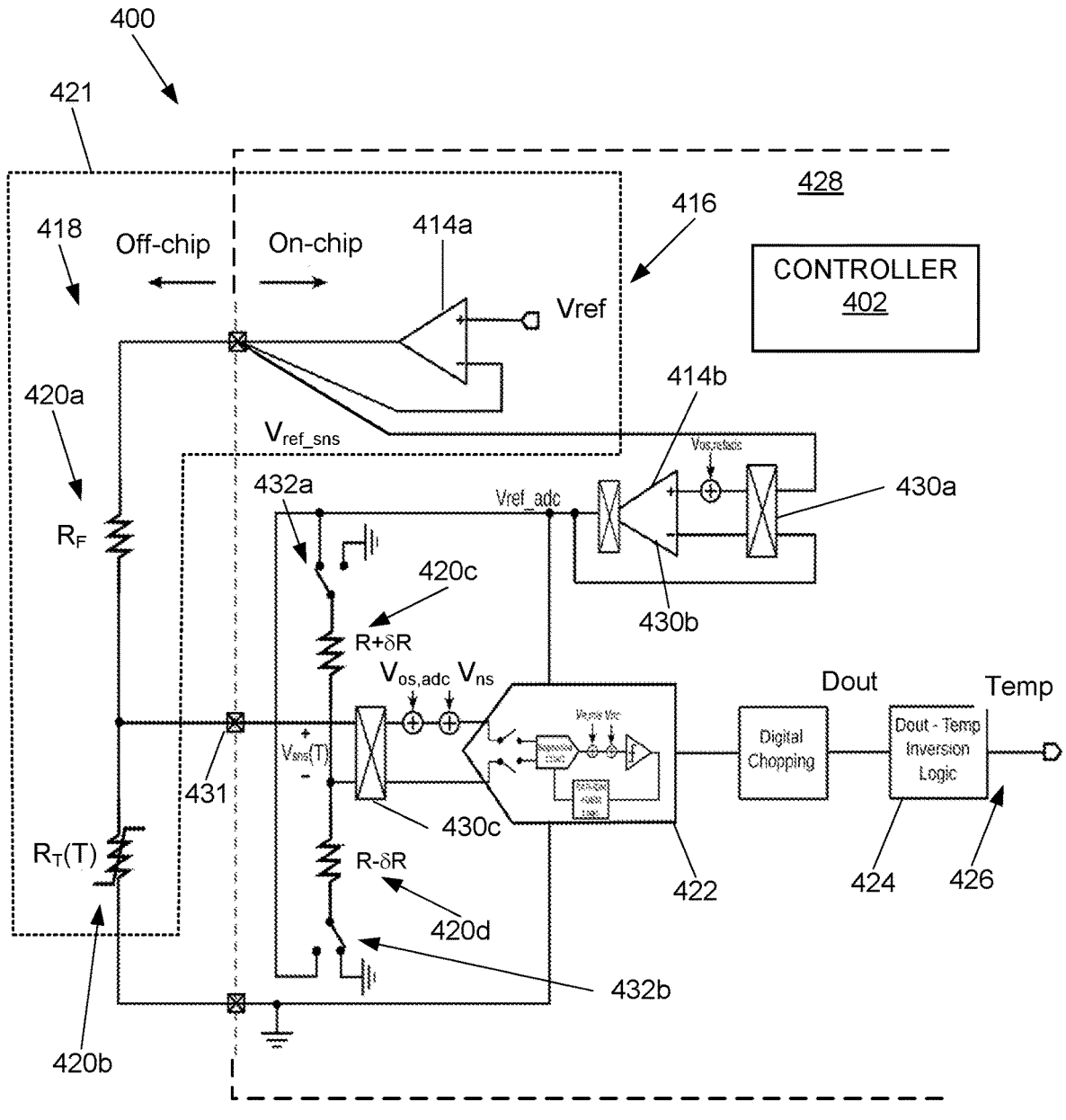
FIG. 4 illustrates an embodiment of an apparatus, in accordance with aspects of the present disclosure.

Further, as shown, in FIG. 4, the apparatus 400 include several on-chip components (e.g., amplifiers 414*a* and 414*b*, ADC 422) that are physically located on a substrate 428 of the apparatus 300. The substrate 428 may include any features shown and described herein for a substrate. As shown, resistors 420*a* and 420*b* (representing off-chip components that may be physically located on another substrate (not shown in FIG. 4) that is separate from the substrate 428) form a set of resistors that is not physically located on the substrate 428, but are nonetheless coupled to (e.g., connected, including electrically connected) to components on the substrate 428. Moreover, the resistors 420*c* and 420*d* (representing on-chip components physically located on the substrate 428) form set of resistors that are physically located on the substrate 428. Beneficially, by being physically located on the substrate 428, the resistors 420*c* and 420*d* can be sampled and resistor mismatch can be compensated for.

Figure 5:
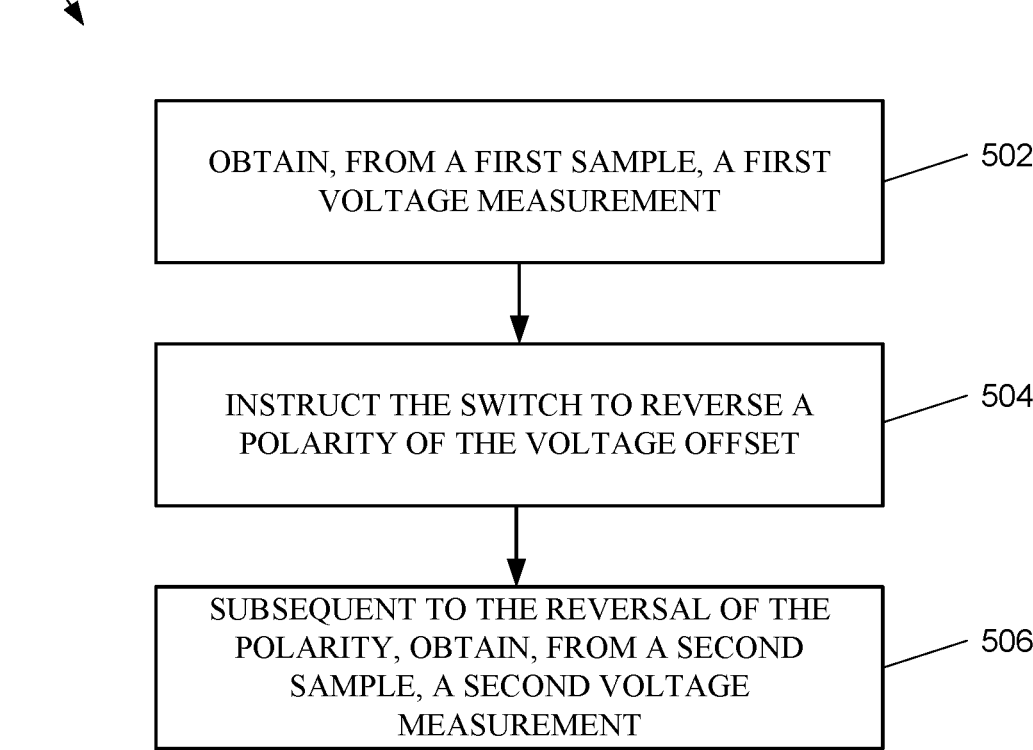
FIG. 5 illustrates a method for compensating an error voltage is shown, in accordance with aspects of the present disclosure.

Referring to FIG. 5, a method 500 for compensating an error voltage is shown. The method 500 may be performed by a controller integrated with a circuit (e.g., temperature sensing circuit). The circuit may include a component (e.g., amplifier, ADC) and a switch (e.g., chopping switch, tuning switch).

At step 502, a first voltage measurement is obtained from a first sample. In some embodiments, the first voltage measurement includes an offset voltage at an input of an ADC or an amplifier. In some embodiments, the first voltage measurement is a measured voltage across a first resistor.

At step 504, the switch is caused to reverse a polarity of the voltage offset. For example, the switch may be instructed (e.g., by the controller) to open or close. In this manner, polarity is reversed (e.g., from positive voltage to negative voltage, or vice versa).

At step 506, subsequent to the reversal of the polarity a second voltage measurement is obtained from a second sample. Based on the reversed polarity, the offset included in the second voltage measurement may be the same magnitude as that of the first voltage measurement, but with a reversed (e.g., an opposite) polarity.

At step 508, an average of the first voltage measurement and the second voltage measurement is determined. Based on the same magnitude but opposite polarities of the offset errors included in the first and second voltage measurements, the average offset/error is zero. However, in some instances, the average is near zero. In either event, the method 500 provides away for compensating for an error source (e.g., error due to voltage offset).

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "physically on" another element, it is to be understood that the element can be located directly on the other element or a surface of the other element, or have intervening elements present between the elements.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus, comprising:
a substrate;
a first resistor physically on the substrate;
an analog-to-digital converter (ADC) coupled to the first resistor, the ADC configured to:
    receive a resistor voltage, wherein the resistor voltage is applied across the first resistor, and
    provide a digital output based on the resistor voltage; and
a second resistor coupled to the substrate, wherein the second resistor is physically off of the substrate;

a first amplifier configured to provide a first voltage to the second resistor; and
a second amplifier configured to receive the first voltage from the first amplifier and provide a second voltage based on the first voltage, wherein the ADC is further configured to receive the second voltage from the second amplifier.

2. The apparatus of claim 1, further comprising a resistor divider that includes the second resistor.

3. The apparatus of claim 2, wherein:
the second resistor comprises a temperature-dependent resistor,
the second voltage compensates the first voltage, and
the resistor voltage is independent of the first voltage and the second voltage after conversation to a digital domain.

4. The apparatus of claim 1, wherein the first resistor is configured to receive the second voltage from the second amplifier.

5. The apparatus of claim 4, further comprising:
a first switch; and
a second switch, wherein the first switch and the second switch are configured to change a polarity of the second voltage provided to the second amplifier.

6. The apparatus of claim 1, wherein:
the second resistor comprises a temperature-dependent resistor configured to change resistance based on a temperature change, and
the resistor voltage is i) based on the temperature-dependent resistor and ii) used to determine a temperature.

7. The apparatus of claim 6, wherein the temperature-dependent resistor comprises a thermistor.

8. The apparatus of claim 1, further comprising a logic circuit configured to receive the digital output from the ADC and convert the digital output to a temperature.

9. An apparatus, comprising:
a first amplifier configured to provide a first voltage output based on a first reference voltage;
a second amplifier configured to:
    use the first voltage output as a second reference voltage, and
    provide a second voltage output based on the second reference voltage;
a resistor divider configured to receive the first output voltage, the resistor divider comprising a temperature-dependent resistor configured to change resistance based on a temperature change; and
an analog-to-digital converter (ADC) configured to:
    receive the second reference voltage,
    receive a resistor voltage, wherein the resistor voltage is applied across the temperature-dependent resistor, and
    generate, based on the second reference voltage and the resistor voltage, a digital output corresponding to a temperature.

10. The apparatus of claim 9, further comprising a logic circuit configured to convert the digital output to the temperature.

11. The apparatus of claim 9, further comprising a circuit, wherein:
the ADC is physically located on the circuit, and
the temperature-dependent resistor is not physically located on the circuit.

12. The apparatus of claim 9, wherein at the resistor divider, the second output voltage is configured to compensate the first output voltage.

13. The apparatus of claim 9, further comprising a switch, wherein in response to an offset voltage, the switch is configured to change a polarity of the offset voltage.

14. A circuit, comprising:

a component comprising an input;

a switch coupled to the component at the input; and a controller configured to, in response to a voltage offset at the component:

obtain, from a first sample, a first voltage measurement of the voltage offset, cause the switch to reverse a polarity of the voltage offset, subsequent to the reversal of the polarity, obtain, from a second sample, a second voltage measurement of the voltage offset, and determine an average of the first voltage measurement and the second voltage measurement.

15. The circuit of claim 14, wherein the average compensates the voltage offset based the reversal of the polarity.

16. The circuit of claim 14, wherein the component is selected from:

an amplifier, or an analog-to-digital converter (ADC).

17. The circuit of claim 14, further comprising:

a first resistor; and a second resistor, wherein the controller is further configured to, in response to a resistor mismatch between the first resistor and the second resistor, use the average to cancel the resistor mismatch based on the reversal of the polarity.

18. The circuit of claim 17, further comprising a temperature-dependent resistor separate from the first resistor and the second resistor, wherein the temperature-dependent resistor is configured to change resistance based on a temperature change.

* * * * *